United States Patent
Yu et al.

(10) Patent No.: US 11,973,649 B2
(45) Date of Patent: Apr. 30, 2024

(54) NETWORK CONFIGURATION METHOD, APPARATUS, AND COMPUTER-READABLE STORAGE MEDIUM

(71) Applicant: HUAWEI TECHNOLOGIES CO., LTD., Shenzhen (CN)

(72) Inventors: Bin Yu, Nanjing (CN); Wenjun Chang, Beijing (CN); Zhihong Lin, Shenzhen (CN); Hanyu Wei, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/148,541

(22) Filed: Dec. 30, 2022

(65) Prior Publication Data

US 2023/0138768 A1 May 4, 2023

Related U.S. Application Data (63) Continuation of application No. PCT/CN2021/098400, filed on Jun. 4, 2021.

(30) Foreign Application Priority Data

Jun. 30, 2020 (CN) .......................... 202010615447.5

(51) Int. Cl.
*H04L 41/08* (2022.01)

(52) U.S. Cl.
CPC ...... *H04L 41/0886* (2013.01); *H04L 41/0889* (2013.01)

(58) Field of Classification Search
None
See application file for complete search history.

(56) References Cited

U.S. PATENT DOCUMENTS 6,516,345 B1 * 2/2003 Kracht .................... H04L 41/12
709/227
9,832,111 B2 * 11/2017 Zhou ....................... H04L 45/38
(Continued)

FOREIGN PATENT DOCUMENTS

| CN | 102123181 A | 7/2011 |
| CN | 102164188 A | 8/2011 |

(Continued)

OTHER PUBLICATIONS

Zhou et al., "Link State Detection Protocol Based on ICMP Extension," Research and Development, ISSN 1003-3254, Coden Csaobn, Computer Systems and Applications, Total 5 pages (Nov. 26, 2017). With an English abstract.

Primary Examiner — Ranodhi Serrao
(74) Attorney, Agent, or Firm — Leydig, Voit & Mayer, Ltd.

(57) ABSTRACT

A network configuration method and apparatus are provided. The method includes: a first execution device sends to a management device, a device discovery message which is a layer 2 packet and includes a first port identifier, wherein a port identified by the first port identifier is a port, in an up state, of the first execution device. The first execution device receives from the management device a first configuration message which is a layer 2 packet and includes a configuration parameter which is for a second execution device and includes an internet protocol address of the second execution device that is connected to the port identified by the first port identifier. The first execution device sends the first configuration message through the port. According to the application, large amount of manpower is saved and network configuration efficiency is improved.

21 Claims, 6 Drawing Sheets

(56) References Cited

U.S. PATENT DOCUMENTS

| | | | | |
|---|---|---|---|---|
| 9,838,221 B2* | 12/2017 | Zhang | ............... | H04L 61/5014 |
| 10,003,495 B1* | 6/2018 | Sharma | ............... | H04L 41/0806 |
| 2011/0161489 A1 | 6/2011 | Bhatt et al. | | |
| 2014/0313931 A1* | 10/2014 | Roper | ............... | H04L 45/66 |
| | | | | 370/254 |
| 2015/0341189 A1* | 11/2015 | Zhang | ............... | H04L 61/5014 |
| | | | | 370/338 |
| 2016/0080254 A1* | 3/2016 | Zhou | ............... | H04L 43/50 |
| | | | | 370/392 |
| 2017/0180213 A1* | 6/2017 | Li | ............... | H04L 41/08 |
| 2017/0279680 A1* | 9/2017 | K Sebastian | ............... | H04L 41/34 |
| 2018/0375721 A1 | 12/2018 | Rondeau | | |
| 2019/0020537 A1* | 1/2019 | Sharma | ............... | H04L 41/0806 |

FOREIGN PATENT DOCUMENTS

| | | | |
|---|---|---|---|
| CN | 102594944 | A | 7/2012 |
| CN | 102739819 | A | 10/2012 |
| CN | 102780569 | A | 11/2012 |
| CN | 105515772 | A | 4/2016 |
| CN | 106412143 | A | 2/2017 |
| CN | 106452860 | A | 2/2017 |
| CN | 106453678 | A | 2/2017 |
| CN | 108055207 | A | 5/2018 |
| CN | 109474481 | A | 3/2019 |
| CN | 105359458 | B | 5/2019 |
| IN | 109120446 | A | 1/2019 |

\* cited by examiner

NETWORK CONFIGURATION METHOD, APPARATUS, AND COMPUTER-READABLE STORAGE MEDIUM

CROSS-REFERENCE TO RELATED APPLICATION

This application is a continuation of International Application No. PCT/CN2021/098400, filed on Jun. 4, 2021, which claims priority to Chinese Patent Application No. 202010615447.5, filed on Jun. 30, 2020. The disclosures of the aforementioned applications are hereby incorporated by reference in their entireties.

TECHNICAL FIELD

This application relates to the field of communication technologies, and in particular, to a network configuration method, an apparatus, and a computer-readable storage medium.

BACKGROUND

Various types of communication networks include a large quantity of network devices. For example, a campus network may include network devices such as a core switch, an aggregation switch, and an access switch. Before the communication network is put into use, network configuration needs to be performed on each network device, to be specific, an internet protocol address is configured on each network device. Herein, the configured internet address may include a management address of the network device and an interconnection address used for communication with another network device.

Currently, network configuration of each network device in a communication network is implemented manually, and a skilled person logs in to each network device and performs network configuration on the network device.

When there are a large quantity of network devices in a communication network, a large amount of manpower is needed to complete network configuration on the network devices, and configuration efficiency is low.

SUMMARY

This application provides a network configuration method, an apparatus, and a computer-readable storage medium, to resolve a problem that, in a related technology, network configuration consumes a large quantity of labor costs and configuration efficiency is low. Technical solutions are as follows:

According to a first aspect, a network configuration method is provided, where the method includes: A first execution device sends a device discovery message to a management device. The device discovery message is a layer 2 packet, the device discovery message includes a first port identifier, and a port identified by the first port identifier is a port, in an up state, other than a port through which the first execution device sends the device discovery message. The first execution device receives a first configuration message from the management device. The first configuration message is a layer 2 packet and includes a configuration parameter for a second execution device. The configuration parameter for the second execution device includes an internet protocol address of the second execution device, and the second execution device is connected to the port identified by the first port identifier. The first execution device sends the first configuration message through the port identified by the first port identifier.

In the solution provided in this application, when a device is connected to a port of the first execution device, a port status of the port of the first execution device changes from a down (down) state to an up (up) state. When the first execution device detects that the port status changes to the up state, it indicates that the device is connected to the port in the up state. In this case, the first execution device may report the device discovery message to the management device. The device discovery message includes the first port identifier, and the port identified by the first port identifier is a detected port whose port status changes to an up state. The device discovery message is used to report, to the management device, that a device is connected to the port identified by the first port identifier of the first execution device. After receiving the device discovery message, the management device may send a configuration message for a newly discovered device to the first execution device, and the first execution device forwards the configuration message to the newly discovered device through the port identified by the first port identifier.

Both device discovery and network configuration on the discovered device may be implemented by the management device and the execution device in cooperation without manpower, to save a large amount of manpower and improve network configuration efficiency.

In a possible implementation, the method further includes: The first execution device receives a second configuration message from the management device. The second configuration message is a layer 2 packet, the second configuration message includes a configuration parameter for the first execution device, and the configuration parameter for the first execution device includes an internet protocol address of the first execution device.

In the solution provided in this application, before the device discovery message is sent to the management device, network configuration may have been completed on the first execution device. The network configuration may be performed by the management device or performed manually.

In a possible implementation, the method further includes: The first execution device receives a first link discovery message from the management device. The first link discovery message is a layer 2 packet, and the first link discovery message includes an address of the management device. The first execution device returns a first link discovery reply message. The first link discovery reply message is a layer 2 packet, and the first link discovery reply message includes a device identifier of the first execution device.

In the solution provided in this application, a process in which the first execution device is configured by the management device is described as follows: The management device sends the first link discovery message to the first execution device, where the first link discovery message is a layer 2 packet, and the first link discovery message includes the address of the management device. The first execution device returns the first link discovery reply message to the management device. After receiving the first link discovery message sent by the management device, the first execution device may return the first link discovery reply message to the management device through layer 2 forwarding by using the address of the management device as a destination address. The first link discovery reply message is used to report device information of the first execution device, for example, a device identifier of the first execution device, to the management device. After receiving the first link discovery reply message returned from the first execution device, the management device may deliver the configuration parameter to the first execution device. After receiving the second configuration message sent by the management device, the first execution device may configure a port based on the configuration parameter in the second configuration message.

In a possible implementation, the method further includes: The first execution device receives a second link discovery message from the management device. The second link discovery message is a layer 2 packet, and the second link discovery message includes the address of the management device and the first port identifier. The first execution device sends a third link discovery message through the port identified by the first port identifier. The third link discovery message is a layer 2 packet, and the third link discovery message includes the address of the management device. The first execution device receives a second link discovery reply message from the second execution device. The second link discovery reply message is a layer 2 packet, and the second link discovery reply message includes a device identifier of the second execution device. The first execution device sends a third link discovery reply message to the management device. The third link discovery reply message is a layer 2 packet, and the third link discovery reply message includes the device identifier of the second execution device and the first port identifier.

In the solution provided in this application, after the first execution device discovers the second execution device and sends the device discovery message for the second execution device to the management device, the management device may further query the second execution device for device information. Specifically, the management device may send the second link discovery message to the first execution device, where the second link discovery message includes the address of the management device and the first port identifier. The first execution device sends the third link discovery message through the port identified by the first port identifier. The third link discovery message may be the foregoing second link discovery message, or may be obtained by deleting the first port identifier from the foregoing second link discovery message. After receiving the third link discovery message used to query for the device information, the second execution device may return the second link discovery reply message to the management device. The second link discovery reply message is first sent to the first execution device, and the first execution device may add the first port identifier to the second link discovery reply message, to obtain the third link discovery reply message. The first execution device sends the third link discovery reply message to the management device through layer 2 forwarding. In this way, the management device may learn that the port identified by the first port identifier of the first execution device is connected to the second execution device, and may further learn of the device information of the second execution device.

In a possible implementation, the second link discovery reply message further includes a second port identifier, a port identified by the second port identifier is a port through which the second execution device is connected to the first execution device, and the third link discovery reply message further includes the second port identifier.

In the solution provided in this application, the second link discovery reply message may further include the second port identifier, and the port identified by the second port identifier is the port through which the second execution device is connected to the first execution device. To be specific, a device reported by the second execution device may include the device identifier and the port identifier of the port connected to the first execution device. Correspondingly, the third link discovery reply message may also include the second port identifier. In this way, a plurality of other execution devices are connected to the second execution device on an upstream, and the management device may learn which port of the second execution device is connected to the first execution device.

In a possible implementation, the internet protocol address of the second execution device includes a management address of the second execution device.

In a possible implementation, the internet protocol address of the second execution device includes an interconnection address used by the second execution device to communicate with another network device.

In a possible implementation, the configuration parameter further includes an address of a controller.

In the solution provided in this application, the controller is a network device configured to manage the management device and the plurality of execution devices in a communication network.

In a possible implementation, the method further includes:

The first execution device sends a registration request to the controller based on the address of the controller.

In a possible implementation, the communication network to which the management device, the first execution device, and the second execution device belong is an underlying network.

In a possible implementation, the communication network to which the management device, the first execution device, and the second execution device belong is a campus network.

According to a second aspect, a network configuration method is provided. The method includes: A management device receives a device discovery message sent by a first execution device, where the device discovery message is a layer 2 packet, the device discovery message includes a first port identifier, and a port identified by the first port identifier is a port, in an up state, other than a port through which the first execution device sends the device discovery message. The management device sends a first configuration message to the first execution device. The first configuration message includes a configuration parameter for a second execution device, the configuration parameter for the second execution device includes an internet protocol address of the second execution device, and the second execution device is connected to the port identified by the first port identifier.

In a possible implementation, the method further includes: The management device sends a second configuration message to the first execution device. The second configuration message is a layer 2 packet, the second configuration message includes a configuration parameter for the first execution device, and the configuration parameter for the first execution device includes an internet protocol address of the first execution device.

In a possible implementation, the method further includes: The management device sends a first link discovery message to the first execution device, where the first link discovery message is a layer 2 packet, and the first link discovery message includes an address of the management device. The management device receives a first link discovery reply message returned from the first execution device, where the first link discovery reply message is a layer 2 packet, and the first link discovery reply message includes a device identifier of the first execution device.

In a possible implementation, the method further includes: The management device sends a second link discovery message to the first execution device. The second link discovery message includes the address of the management device and the first port identifier, and the second link discovery message indicates the first execution device to send a third link discovery message through the port identified by the first port identifier.

In a possible implementation, a second link discovery reply message further includes a second port identifier, and a port identified by the second port identifier is a port through which the second execution device is connected to the first execution device.

According to a third aspect, a network configuration apparatus is provided, where the apparatus is deployed on a first execution device, and the apparatus includes:
 a sending module, configured to send a device discovery message to a management device, where the device discovery message is a layer 2 packet, the device discovery message includes a first port identifier, and a port identified by the first port identifier is a port, in an up state, other than a port through which the first execution device sends the device discovery message;
 a receiving module, configured to receive a first configuration message from the management device, where the first configuration message is a layer 2 packet, the first configuration message includes a configuration parameter for a second execution device, the configuration parameter for the second execution device includes an internet protocol address of the second execution device, and the second execution device is connected to the port identified by the first port identifier; and
 a forwarding module, configured to send the first configuration message through the port identified by the first port identifier.

In a possible implementation, the receiving module is further configured to:
 receive a second configuration message from the management device, where the second configuration message is a layer 2 packet, the second configuration message includes a configuration parameter for the first execution device, and the configuration parameter for the first execution device includes an internet protocol address of the first execution device.

In a possible implementation, the receiving module is further configured to:
 receive a first link discovery message from the management device, where the first link discovery message is a layer 2 packet, and the first link discovery message includes an address of the management device.

The sending module is further configured to return a first link discovery reply message, where the first link discovery reply message is a layer 2 packet, and the first link discovery reply message includes a device identifier of the first execution device.

In a possible implementation, the receiving module is further configured to:
 receive a second link discovery message from the management device, where the second link discovery message is a layer 2 packet, and the second link discovery message includes the address of the management device and the first port identifier.

The forwarding module is further configured to send a third link discovery message through the port identified by the first port identifier, where the third link discovery message is a layer 2 packet, and the third link discovery message includes the address of the management device.

The receiving module is further configured to receive a second link discovery reply message from the second execution device, where the second link discovery reply message is a layer 2 packet, and the second link discovery reply message includes a device identifier of the second execution device.

The forwarding module is further configured to send a third link discovery reply message to the management device, where the third link discovery reply message is a layer 2 packet, and the third link discovery reply message includes the device identifier of the second execution device and the first port identifier.

In a possible implementation, the second link discovery reply message further includes a second port identifier, a port identified by the second port identifier is a port through which the second execution device is connected to the first execution device, and the third link discovery reply message further includes the second port identifier.

According to a fourth aspect, a network configuration apparatus is provided, where the apparatus is deployed on a management device, and the apparatus includes:
 a receiving module, configured to receive a device discovery message sent by a first execution device, where the device discovery message is a layer 2 packet, the device discovery message includes a first port identifier, and a port identified by the first port identifier is a port, in an up state, other than a port through which the first execution device sends the device discovery message; and
 a sending module, configured to send a first configuration message to the first execution device, to enable the first execution device to send the first configuration message through the port identified by the first port identifier, where the first configuration message is a layer 2 packet, the first configuration message includes a configuration parameter for a second execution device, the configuration parameter for the second execution device includes an internet protocol address of the second execution device, and the second execution device is connected to the port identified by the first port identifier.

In a possible implementation, the sending module is further configured to:
 send a second configuration message to the first execution device, where the second configuration message is a layer 2 packet, the second configuration message includes a configuration parameter for the first execution device, and the configuration parameter for the first execution device includes an internet protocol address of the first execution device.

In a possible implementation, the sending module is further configured to:
 send a first link discovery message to the first execution device, where the first link discovery message is a layer 2 packet, and the first link discovery message includes an address of the management device.

The receiving module is further configured by the management device to receive a first link discovery reply message returned from the first execution device, where the first link discovery reply message is a layer 2 packet, and the first link discovery reply message includes a device identifier of the first execution device.

In a possible implementation, the sending module is further configured to:
 send a second link discovery message to the first execution device, where the second link discovery message includes the address of the management device and the first port identifier, and the second link discovery message indicates the first execution device to send a third link discovery message through the port identified by the first port identifier.

In a possible implementation, a second link discovery reply message further includes a second port identifier, and a port identified by the second port identifier is a port through which the second execution device is connected to the first execution device.

According to a fifth aspect, an execution device is provided, where the execution device includes a processor and a memory. The memory stores a program, and the processor is configured to invoke the program stored in the memory, so that the execution device performs the network configuration method according to the first aspect.

According to a sixth aspect, a management device is provided, where the management device includes a processor and a memory. The memory stores a program, and the processor is configured to invoke the program stored in the memory, so that the execution device performs the network configuration method according to the second aspect.

According to a seventh aspect, a computer-readable storage medium is provided, where the computer-readable storage medium stores a computer program. When the computer program runs on a network device, the network device is enabled to perform the network configuration method according to the first aspect or the second aspect.

According to an eighth aspect, a computer program product including instructions is provided. When the computer program product runs on a network device, the network device is enabled to perform the network configuration method according to the first aspect or the second aspect.

The technical solutions provided in this application bring the following beneficial effects:

A discovered execution device (the first execution device) discovers a new execution device (the second execution device) directly connected to the discovered execution device, and the first execution device reports the device discovery message to the management device. The device discovery message includes the first port identifier, and the port identified by the first port identifier is the port, in the up state, of the first execution device. To be specific, the first execution device reports, to the management device, that a device is connected to the port identified by the first port identifier of the first execution device. After receiving the device discovery message, the management device may deliver the configuration parameter for the second execution device to the first execution device, and the first execution device forwards the configuration parameter to the second execution device, to complete network configuration on the second execution device. In this way, each execution device may discover a device connected to the execution device and report the device to the management device, and the management device performs network configuration on the execution device. An entire process of device discovery and network configuration may be implemented by each device, to save a large amount of manpower and improve network configuration efficiency.

DESCRIPTION OF EMBODIMENTS

Figure 1:
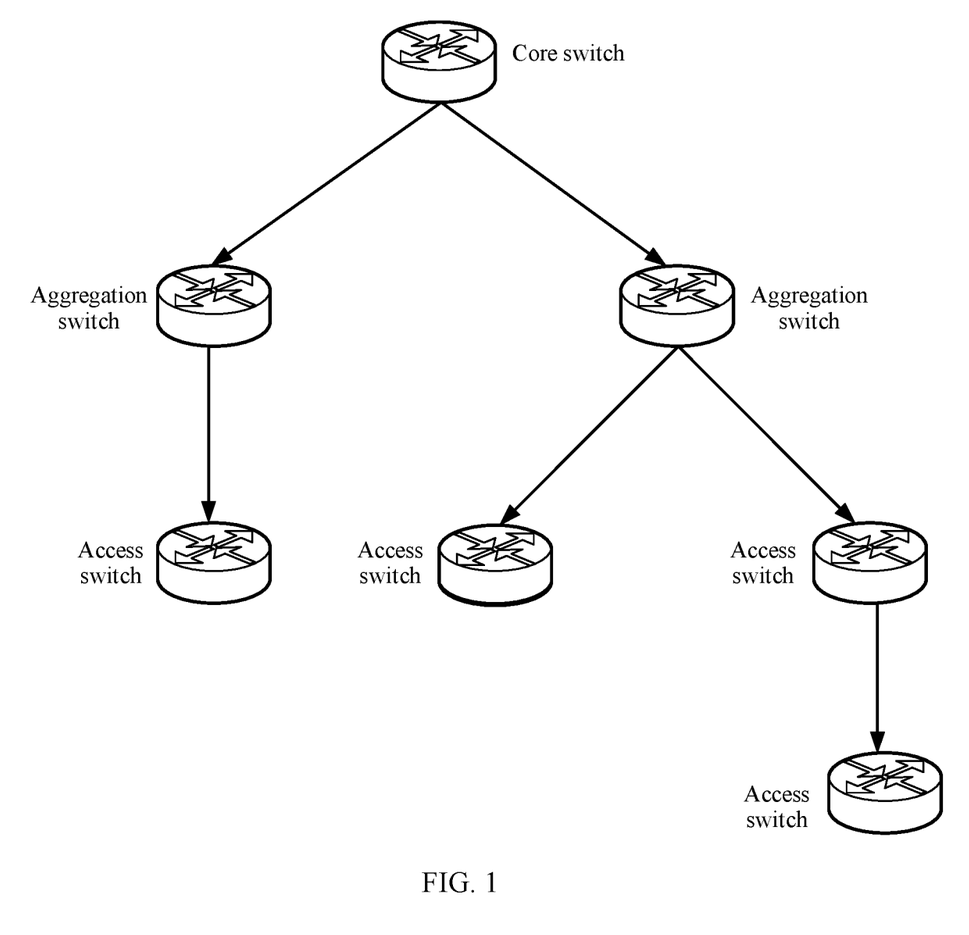
FIG. 1 is a schematic diagram of a communication network according to an embodiment of this application.
Figure 2:
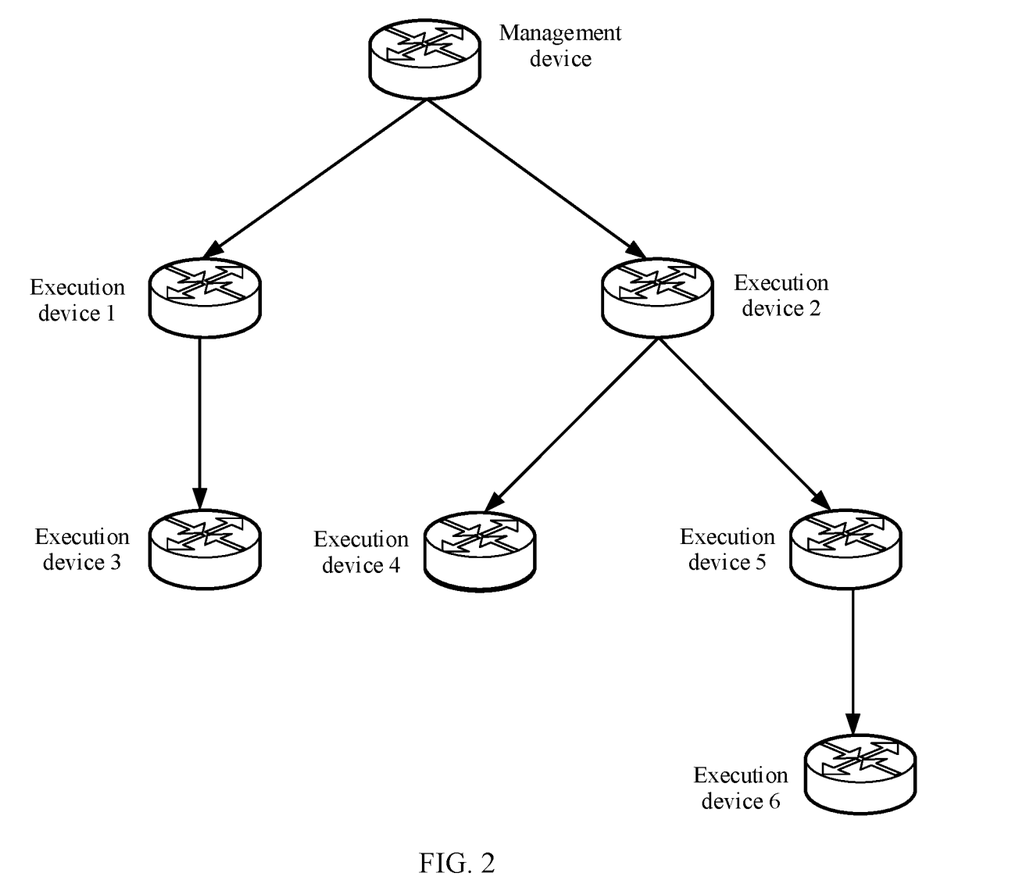
FIG. 2 is a schematic diagram of a communication network according to an embodiment of this application.

Embodiments of this application provide a network configuration method, and the method may be applied to a communication network. The communication network may be a data center network (data center network, DCN), a metropolitan area network, a wide area network, a campus network, or the like. In a communication network shown in FIG. 1, roles of devices are classified into a core switch, an aggregation switch, and an access switch. In embodiments of this application, roles of devices in a communication network are redefined. Network devices are classified into a management device and an execution device. An upstream network device may be specified as a management device, and other network devices may be specified as execution devices. For example, in a communication network shown in FIG. 2, the core switch in FIG. 1 may be specified as a management device, and both the aggregation switch and the access switch may be specified as execution devices.

Figure 3:
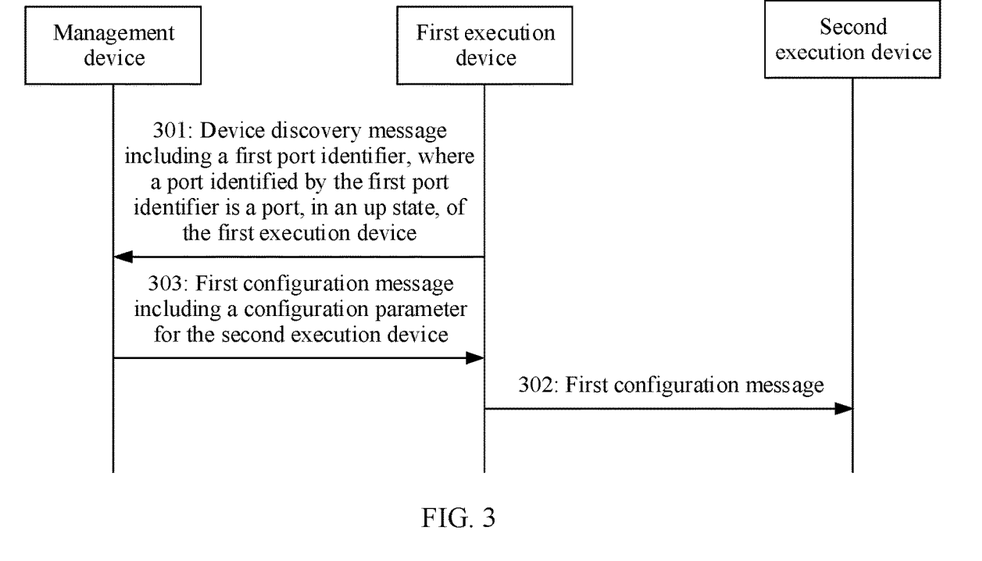
FIG. 3 is a flowchart of a network configuration method according to an embodiment of this application.

Refer to FIG. 3. A network configuration method provided in an embodiment of this application may include the following processing procedure.

Step 301: A first execution device sends a device discovery message to a management device.

The first execution device may be any execution device in a communication network. The device discovery message is a layer 2 packet, the device discovery message includes a first port identifier, and a port identified by the first port identifier is a port, in an up state, other than a port through which the first execution device sends the device discovery message.

During implementation, when a device is connected to a port of the first execution device, a port status of the port of the first execution device changes from a down (down) state to an up (up) state. When the first execution device detects that the port status changes to the up state, it indicates that the device is connected to the port in the up state. In this case, the first execution device may report the device discovery message to the management device. The device discovery message includes the first port identifier, and the port identified by the first port identifier is the port, in the up state, other than the port through which the first execution device sends the device discovery message. The device discovery message is used to report, to the management device, that a device is connected to the port identified by the first port identifier of the first execution device.

In addition, when detecting that a port status of a port changes to an up state, the first execution device may not immediately report the device discovery message to the management device. Instead, the first execution device reports the device discovery message to the management device based on a fixed detection period. Correspondingly, in this case, a port identified by a port identifier included in the device discovery message is a port whose port status changes from a down state to an up state in a current detection period.

In a possible implementation, before the device discovery message is sent to the management device, network configuration may have been completed on the first execution device. The network configuration may be performed on the first execution device manually, or may be performed by the management device. If the management device performs network configuration, and the first execution device is not directly connected to the management device, the first execution device may be configured according to a method for configuring a second execution device in steps 301 to 303. If the management device performs network configuration, and the first execution device is directly connected to the management device, the network configuration may be performed on the first execution device by the management device based on the following steps.

S11: The management device sends a first link discovery message to the first execution device.

The first link discovery message is a layer 2 packet, and the first link discovery message includes an address of the management device. Herein, the address of the management device may be a media access control (Media Access Control, MAC) address of the management device.

During implementation, when detecting that a port status of a target port changes from a down state to an up state, the management device sends the first link discovery message through the target port. The first link discovery message includes the MAC address of the management device, and the first link discovery message notifies the first execution device of the address of the management device and queries the first execution device for device information.

Figure 4:
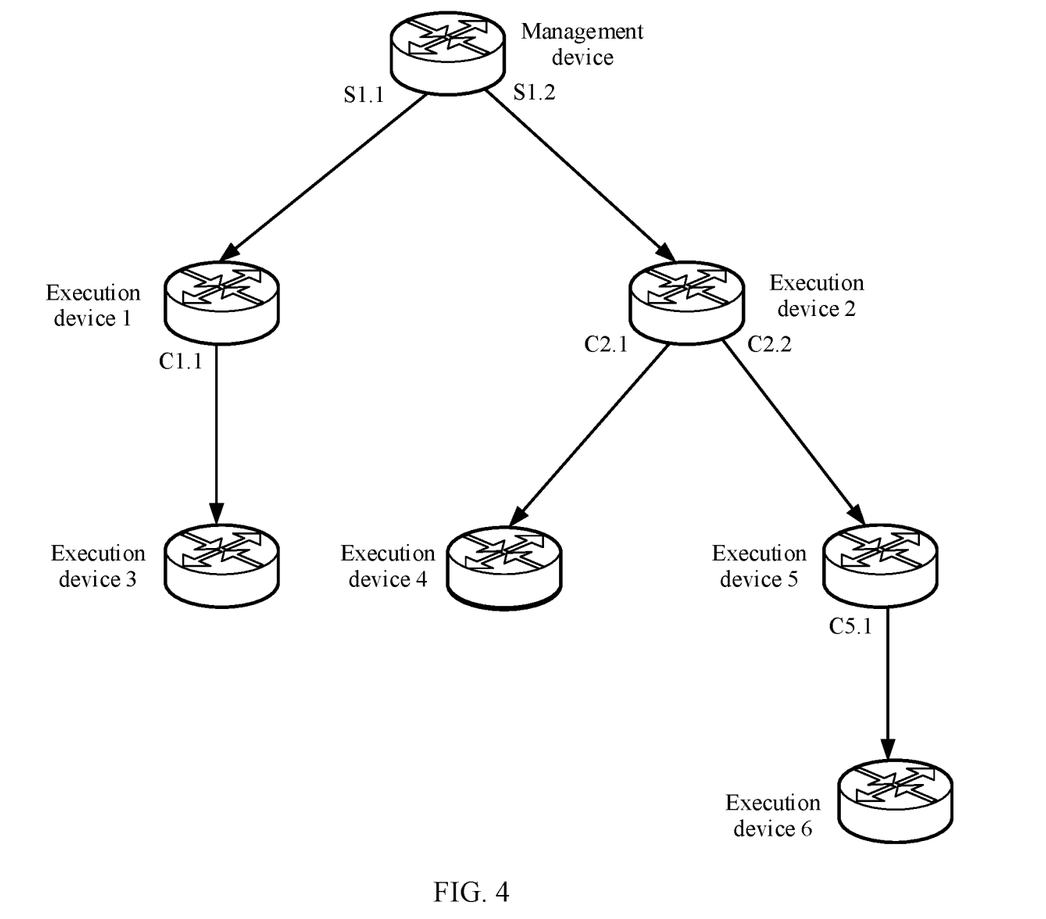
FIG. 4 is a schematic diagram of a communication network according to an embodiment of this application.

For example, as shown in FIG. 4, if the management device detects that a port S1.1 and a port S1.2 are in up states, the management device may send link discovery messages through the port S1.1 and the port S1.2 respectively. In this case, the link discovery message sent through the port S1.1 may be received by an execution device 1, and the link discovery message sent through the port S1.2 may be received by an execution device 2.

S12: The first execution device returns a first link discovery reply message to the management device.

The first link discovery reply message is a layer 2 packet, and the first link discovery reply message includes a device identifier of the first execution device. The device identifier may be a MAC address.

During implementation, after receiving the first link discovery message sent by the management device, the first execution device may return the first link discovery reply message to the management device through layer 2 forwarding by using the address of the management device as a destination address. The first link discovery reply message is used to report the device information of the first execution device, for example, the device identifier of the first execution device, to the management device.

S13: The management device sends a configuration message to the first execution device.

The configuration message is a layer 2 packet, the configuration message includes a configuration parameter for the first execution device, and the configuration parameter for the first execution device includes an internet protocol address of the first execution device. The internet protocol address of the first execution device may include a management address of the first execution device and an interconnection address used by the first execution device to communicate with another device.

During implementation, after receiving the first link discovery reply message returned from the first execution device, the management device may allocate the management address and the interconnection address to the first execution device, and send, to the first execution device, the management address and the interconnection address that are allocated to the first execution device. In addition, the configuration parameter may further include an address of a controller. The controller is a device configured by a skilled person to manage each network device in a communication network.

It should be further noted herein that, after the management device is specified, a skilled person may first complete network configuration on the management device, to be specific, configuration of an internet protocol address of the management device. In addition, the skilled person further needs to deliver, to the management device, an address segment of an internet protocol address that needs to be allocated to each execution device in the communication network, where the address segment includes an address segment of the management address and an address segment of the interconnection address. When delivering the configuration parameter to the execution device, the management device may, based on a topology of the communication network, allocate the management address to the execution device in the address segment of the management address, and allocate the management address to the execution device in the address segment of the interconnection address. In addition, when configuring the internet protocol address on the management device, the skilled person may further deliver the address of the controller to the management device. In this case, the management device may initiate a registration request to the controller by using the address of the controller as the destination address, to complete registration of the management device with the controller.

After receiving the configuration message sent by the management device, the first execution device may configure the port based on the configuration parameter in the configuration message. In addition, if the configuration parameter includes the address of the controller, the first execution device may initiate a registration request to the controller, to complete registration with the controller.

302: The management device sends a first configuration message to the first execution device.

The first configuration message is a layer 2 packet, the first configuration message includes a configuration parameter for the second execution device, the configuration parameter for the second execution device includes an internet protocol address of the second execution device, and the second execution device is connected to the port identified by the first port identifier.

During implementation, after receiving the device discovery message sent by the first execution device, the management device may allocate the configuration parameter to the newly discovered second execution device, and first send, to the first execution device through layer 2 forwarding, the first configuration message including the configuration parameter for the second execution device, and then the first execution device forwards the first configuration message to the second execution device.

In a possible implementation, after the first execution device discovers the second execution device and sends the device discovery message for the second execution device to the management device, the management device may query the second execution device for device information. Processing may be as follows:

S21: The management device sends a second link discovery message to the first execution device.

The second link discovery message includes the address of the management device and the first port identifier, the second link discovery message indicates the first execution device to send a third link discovery message through the port identified by the first port identifier, and the second link discovery message is a layer 2 packet.

During implementation, after the first execution device reports the device discovery message to the management device, the management device may send the second link discovery message to the first execution device. The second link discovery message is a layer 2 packet, and a destination address in the second link discovery message is the address of the first execution device. The second link discovery message is used to query a second execution identifier for the device information.

S22: The first execution device sends the third link discovery message through the port identified by the first port identifier.

The third link discovery message is a layer 2 packet.

S23: The second execution device sends a second link discovery reply message to the first execution device.

The second link discovery reply message is a layer 2 packet, and the second link discovery reply message includes a device identifier of the second execution device.

During implementation, S22 and S23 may be performed before or after S21, or S22 and S23, and S21 may be simultaneously performed. The following describes implementations of S22 and S23 in different cases.

Case 1: S22 and S23 are performed before S21, or S22 and S23, and S21 are simultaneously performed.

S22: The first execution device may generate the third link discovery message based on a preset format of a link discovery message, and send the third link discovery message through the port identified by the first port identifier. The third link discovery message may be generated and sent after the device discovery message is sent to the management device. Certainly, after it is determined that a port status changes to an up state, the third link discovery message may be generated and sent simultaneously with the device discovery message, or generated and sent before the device discovery message is sent. In this case, a time sequence of sending the third link discovery message and the device discovery message is not limited. The third link discovery message is used to query the second execution device for the device information.

S23: After receiving the third link discovery message, the second execution device may send the second link discovery reply message through the port that receives the third link discovery message. The second link discovery reply message includes the device identifier of the second execution device. After receiving the second link discovery reply message, the first execution device may store the second link discovery reply message in correspondence to the first port identifier. In a possible implementation, the second link discovery reply message may further include a second port identifier, and a port identified by the second port identifier is a port through which the second execution device is connected to the first execution device.

Case 2: S22 and S23 are performed after S21.

S22: After receiving the second link discovery message sent by the management device, the first execution device may send the second link discovery message as the third link discovery message to the second execution device through the port identified by the first port identifier. Alternatively, after receiving the second link discovery message, to reduce a volume of data to be transmitted, the first execution device may first delete the first port identifier from the second link discovery message to obtain the third link discovery message, and then send the third link message to the second execution device through the port identified by the first port identifier.

S23: After receiving the third link discovery message, the second execution device may send the second link discovery reply message to the first execution device. The third link discovery message may include the address of the management device, and the second execution device may record a correspondence between the address of the management device and the port (namely, the port identified by the second port identifier) for receiving the third link discovery message. In this way, the second link discovery reply message may be sent to the first execution device through layer 2 forwarding by using the address of the management device as the destination address.

S24: The first execution device sends the third link discovery reply message to the management device.

During implementation, corresponding to the foregoing Case 1, after S21 is completed, to be specific, after receiving the second link discovery message sent by the management device, the first execution device may locally obtain the stored second link discovery reply message corresponding to the first port identifier. If the second link discovery reply message corresponding to the first port identifier is not obtained locally, it indicates that the second link discovery reply message sent by the second execution device is not received yet. In this case, the first execution device may first wait to obtain the second link discovery reply message. After the second link discovery reply message is obtained, the first port identifier may be added to the second link discovery reply message to obtain the third link discovery reply message. The first execution device may use the address of the management device as a destination address of the third link discovery reply message, and send the third link discovery reply message to the management device through layer 2 forwarding. In this way, the management device may learn that the port identified by the first port identifier of the first execution device is connected to the second execution device, and may further learn of the device information of the second execution device.

Corresponding to the foregoing Case 2, after S23 is completed, to be specific, after receiving the second link discovery reply message sent by the second execution device, the first execution device may add the first port identifier to the second link discovery reply message to obtain the third link discovery reply message. The first execution device may use the address of the management device as the destination address of the third link discovery reply message, and send the third link discovery reply message to the management device through layer 2 forwarding.

Step 303: The first execution device sends the first configuration message through the port identified by the first port identifier.

During implementation, a destination address of the first configuration message may be the address of the first execution device. In this case, the first configuration message further needs to include the first port identifier, to instruct the first execution device to send the first configuration message to the second execution device through the port identified by the first port identifier. In this case, the first execution device may delete the first port identifier in the first configuration message, and then send, to the second execution device through the port identified by the first port identifier, the first configuration message in which the first port identifier is deleted. In this case, S21 to S24 may not need to be performed.

Alternatively, the first configuration message is a layer 2 packet, and the destination address of the configuration message may be an address of the second execution device. The first configuration message is first forwarded to the first execution device through layer 2 forwarding, and then the first execution device queries a MAC address table, and then forwards the first configuration message to the second execution device through the port identified by the found first port identifier. In this case, S21 to S24 need to be performed and completed first. In this way, the first execution device can record a correspondence between the address of the second execution device and an egress port (the port identified by the first port identifier) in the MAC address table.

After receiving the first configuration message, the second execution device may configure the port based on a configuration parameter in a second configuration message. In addition, if the configuration parameter includes the address of the controller, the second execution device may initiate a registration request to the controller, to complete registration with the controller.

In this embodiment of this application, a discovered execution device (the first execution device) discovers a new execution device (the second execution device) directly connected to the discovered execution device, and the first execution device reports the device discovery message to the management device. The device discovery message includes the first port identifier, and the port identified by the first port identifier is the port, in the up state, of the first execution device. To be specific, the first execution device reports, to the management device, that a device is connected to the port identified by the first port identifier of the first execution device. After receiving the device discovery message, the management device may deliver the configuration parameter for the second execution device to the second execution device, to complete network configuration on the second execution device. In this way, each execution device may discover a device connected to the execution device and report the device to the management device, and the management device performs network configuration on the execution device. An entire process of device discovery and network configuration may be implemented by each device without manpower, to save a large amount of manpower and improve network configuration efficiency.

The following briefly describes a network configuration procedure in a communication network shown in FIG. 4 with reference to the network configuration method provided in embodiments of this application.

Step 401: A management device detects that a port S1.1 and a port S1.2 are in up states, and sends link discovery messages through the port S1.1 and the port S1.2 respectively.

Step 402: After receiving the link discovery messages, an execution device 1 and an execution device 2 respectively return link discovery reply messages to the management device.

The link discovery reply message sent by the execution device 1 includes a device identifier of the execution device 1, and the link discovery reply message sent by the execution device 2 includes a device identifier of the execution device 2.

Step 403: After receiving the link discovery reply messages respectively sent by the execution device 1 and the execution device 2, the management device respectively sends configuration messages to the execution device 1 and the execution device 2.

The configuration message sent to the execution device 1 includes an internet protocol address allocated to the execution device 1, and the configuration message sent to the execution device 2 includes an internet protocol address allocated to the execution device 1.

Step 404: After receiving the configuration messages, the execution device 1 and the execution device 2 complete network configuration on the ports.

Step 405: The execution device 1 detects that a port C1.1 is in an up state, and may send a device discovery message to the management device, where the device discovery message includes a port identifier of the port C1.1. Similarly, the execution device 2 detects that a port C2.1 and a port C2.2 are in up states, and may send a device discovery message to the management device, where the device discovery message includes a port identifier of the port C2.1 and a port identifier of the port C2.2.

Step 406: After receiving the device discovery message sent by the execution device 1, the management device sends a link discovery message to the execution device 1, where the link discovery message includes the port identifier of the port C1.1. After receiving the link discovery message, the execution device 1 may send the link discovery message through the port C1.1, where the link discovery message may not include the port identifier of the port C1.1. Similarly, after receiving the device discovery message sent by the execution device 2, the management device sends a link discovery message to the execution device 2, where the link discovery message includes the port identifier of the port C2.1 and the port identifier of the port C2.2. After receiving the link discovery message, the execution device 2 may separately send the link discovery message through the port C2.1 and the port C2.2. The link discovery message sent through the port C2.1 and the port C2.2 may not include the port identifier of the port C2.1 and the port identifier of the port C2.2.

Step 407: After receiving the link discovery message, an execution device 3 may return a link discovery reply message to the management device, where the link discovery reply message includes a device identifier of the execution device 3. Similarly, after receiving the link discovery message, an execution device 4 may return a link discovery reply message to the management device, where the link discovery reply message includes a device identifier of the execution device 4. After receiving the link discovery message, an execution device 5 may return a link discovery reply message to the management device, where the link discovery reply message includes a device identifier of the execution device 5.

Step 408: After receiving the link discovery reply message returned from the execution device 3, the management device may send a configuration message to the execution device 3. Similarly, after receiving the link discovery reply message returned from the execution device 4, the management device may send a configuration message to the execution device 4. After receiving the link discovery reply message returned from the execution device 5, the management device may send a configuration message to the execution device 5.

Step 409: After receiving the configuration message, the execution device 3 may perform network configuration on a port based on the configuration message. Similarly, after receiving the configuration message, the execution device 4 may perform network configuration on a port based on the configuration message, and after receiving the configuration message, the execution device 5 may perform network configuration on a port based on the configuration message.

Step 410: The execution device 5 detects that a port C5.1 is in an up state, and may send a device discovery message to the management device, where the device discovery message includes a port identifier of the port C5.1.

Step 411: After receiving the device discovery message sent by the execution device 5, the management device sends a link discovery message to the execution device 5, where the link discovery message includes the port identifier of the port C5.1. After receiving the link discovery message, the execution device 5 may send the link discovery message through the port C5.1, where the link discovery message may not include the port identifier of the port C5.1.

Step 412: After receiving the link discovery message, an execution device 6 may return a link discovery reply message to the management device, where the link discovery reply message includes a device identifier of the execution device 6.

Step 413: After receiving the link discovery reply message returned from the execution device 6, the management device may send a configuration message to the execution device 6.

Step 414: After receiving the configuration message, the execution device 6 may perform network configuration on a port based on the configuration message.

Figure 5:
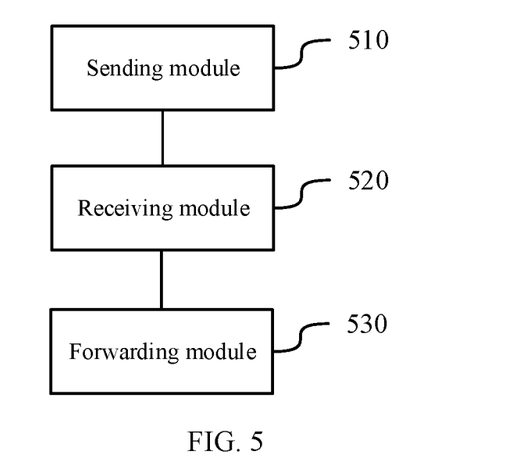
FIG. 5 is a schematic diagram of a structure of a network configuration apparatus according to an embodiment of this application.

Based on a same technical concept, embodiments of this application further provide a network configuration apparatus. The apparatus is deployed on a first execution device. As shown in FIG. 5, the apparatus includes:

a sending module 510, configured to send a device discovery message to a management device, where the device discovery message is a layer 2 packet, the device discovery message includes a first port identifier, and a port identified by the first port identifier is a port, in an up state, other than a port through which the first execution device sends the device discovery message, where specifically, the sending function of the first execution device mentioned in step 301 and other implicit steps may be implemented;

a receiving module 520, configured to receive a first configuration message from the management device, where the first configuration message is a layer 2 packet, the first configuration message includes a configuration parameter for a second execution device, the configuration parameter for the second execution device includes an internet protocol address of the second execution device, and the second execution device is connected to the port identified by the first port identifier, where specifically, the receiving function of the first execution device mentioned in step 302 and other implicit steps may be implemented; and a forwarding module 530, configured to send the first configuration message through the port identified by the first port identifier, where specifically, the forwarding function of the first execution device mentioned in step 303 and other implicit steps may be implemented.

In a possible implementation, the receiving module 520 is further configured to:

receive a second configuration message from the management device, where the second configuration message is a layer 2 packet, the second configuration message includes a configuration parameter for the first execution device, and the configuration parameter for the first execution device includes an internet protocol address of the first execution device.

In a possible implementation, the receiving module 520 is further configured to:

receive a first link discovery message from the management device, where the first link discovery message is a layer 2 packet, and the first link discovery message includes an address of the management device.

The sending module 510 is further configured to return a first link discovery reply message, where the first link discovery reply message is a layer 2 packet, and the first link discovery reply message includes a device identifier of the first execution device.

In a possible implementation, the receiving module 520 is further configured to:

receive a second link discovery message from the management device, where the second link discovery message is a layer 2 packet, and the second link discovery message includes the address of the management device and the first port identifier.

The forwarding module 530 is further configured to send a third link discovery message through the port identified by the first port identifier, where the third link discovery message is a layer 2 packet, and the third link discovery message includes the address of the management device.

The receiving module 520 is further configured to receive a second link discovery reply message from the second execution device, where the second link discovery reply message is a layer 2 packet, and the second link discovery reply message includes a device identifier of the second execution device.

The forwarding module 530 is further configured to send a third link discovery reply message to the management device, where the third link discovery reply message is a layer 2 packet, and the third link discovery reply message includes the device identifier of the second execution device and the first port identifier.

In a possible implementation, the second link discovery reply message further includes a second port identifier, a port identified by the second port identifier is a port through which the second execution device is connected to the first execution device, and the third link discovery reply message further includes the second port identifier.

It should be noted that when the network configuration apparatus provided in the foregoing embodiment performs configuration network, descriptions are provided only by using an example of division of the functional modules. In actual application, the functions may be allocated to different functional modules for implementation as needed. That is, an internal structure of the execution device is divided into different functional modules to implement all or some functions described above. In addition, the network configuration apparatus provided in the foregoing embodiment is based on a same concept as the embodiments illustrating the network configuration method. For a specific implementation process, refer to the method embodiments. Details are not described herein again.

Figure 6:
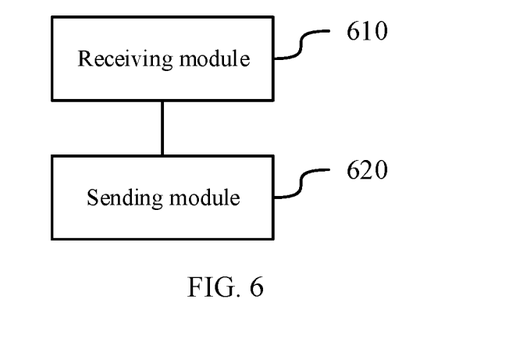
FIG. 6 is a schematic diagram of a structure of a network configuration apparatus according to an embodiment of this application.

Based on a same technical concept, embodiments of this application further provide a network configuration apparatus. The apparatus is deployed on a management device. As shown in FIG. 6, the apparatus includes:

a receiving module 610, configured to receive a device discovery message sent by a first execution device, where the device discovery message is a layer 2 packet, the device discovery message includes a first port identifier, and a port identified by the first port identifier is a port, in an up state, other than a port through which the first execution device sends the device discovery message, where specifically, the receiving function of the management device mentioned in step 301 and other implicit steps may be implemented; and a sending module 620, configured to send a first configuration message to the first execution device, to enable the first execution device to send the first configuration message through the port identified by the first port identifier, where the first configuration message is a layer 2 packet, the first configuration message includes a configuration parameter for a second execution device, the configuration parameter for the second execution device includes an internet protocol address of the second execution device, and the second execution device is connected to the port identified by the first port identifier, where specifically, the sending function of the management device mentioned in step 302 and other implicit steps may be implemented.

In a possible implementation, the sending module 620 is further configured to:

send a second configuration message to the first execution device, where the second configuration message is a layer 2 packet, the second configuration message includes a configuration parameter for the first execution device, and the configuration parameter for the first execution device includes an internet protocol address of the first execution device.

In a possible implementation, the sending module 620 is further configured to:

send a first link discovery message to the first execution device, where the first link discovery message is a layer 2 packet, and the first link discovery message includes an address of the management device.

The receiving module is further configured by the management device to receive a first link discovery reply message returned from the first execution device, where the first link discovery reply message is a layer 2 packet, and the first link discovery reply message includes a device identifier of the first execution device.

In a possible implementation, the sending module 620 is further configured to:

send a second link discovery message to the first execution device, where the second link discovery message includes the address of the management device and the first port identifier, and the second link discovery message indicates the first execution device to send a third link discovery message through the port identified by the first port identifier.

In a possible implementation, a second link discovery reply message further includes a second port identifier, and a port identified by the second port identifier is a port through which the second execution device is connected to the first execution device.

It should be noted that when the network configuration apparatus provided in the foregoing embodiment performs configuration network, descriptions are provided only by using an example of division of the functional modules. In actual application, the functions may be allocated to different functional modules for implementation as needed. That is, an internal structure of the management device is divided into different functional modules to implement all or some functions described above. In addition, the network configuration apparatus provided in the foregoing embodiment is based on a same concept as the embodiments illustrating the network configuration method. For a specific implementation process, refer to the method embodiments. Details are not described herein again.

Figure 7:
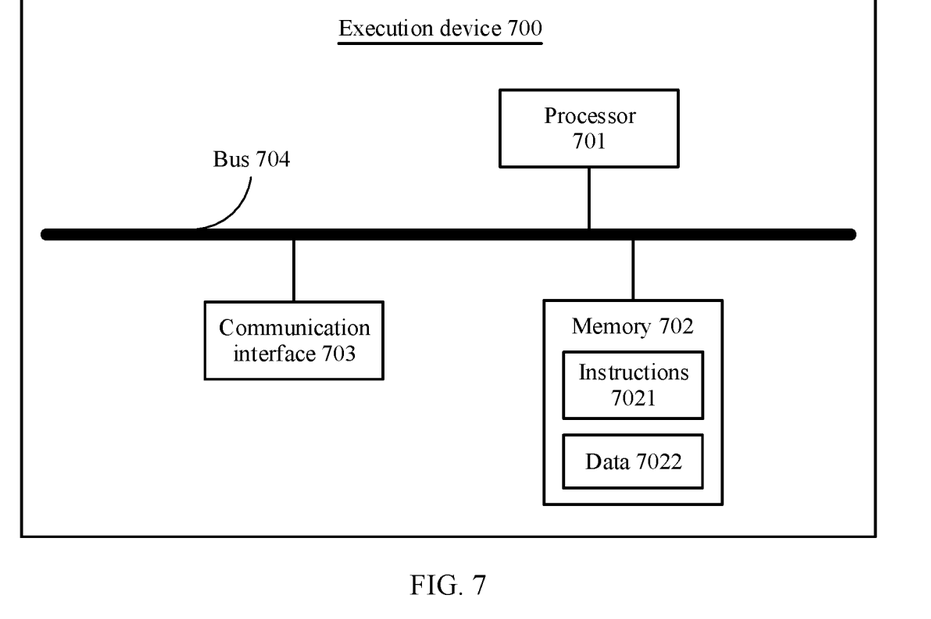
FIG. 7 is a schematic diagram of a structure of an execution device according to an embodiment of this application.

Embodiments of this application further provide an execution device. As shown in FIG. 7, the execution device 700 may be the first execution device in the foregoing embodiment, and includes a processor 701, a memory 702, a communication interface 703, and a bus 704. The processor 701, the memory 702, and the communication interface 703 are communicatively connected to each other through the bus 704. A person skilled in the art should understand that a connection manner among the processor 701, the memory 702, and the communication interface 703 shown in FIG. 7 is merely an example. In an implementation process, the processor 701, the memory 702, and the communication interface 703 may alternatively be communicatively connected to each other in a connection manner other than through the bus 704.

The memory 702 is configured to store instructions 7021 and data 7022. The memory 702 may be various types of storage media. For example, the memory 702 may be a random access memory (random access memory, RAM), a read-only memory (read-only memory, ROM), a non-volatile RAM (non-volatile RAM, NVRAM), a programmable ROM (programmable ROM, PROM), an erasable PROM (erasable PROM, EPROM), an electrically erasable PROM (electrically erasable PROM, EEPROM), a flash memory, an optical memory, or a register. In addition, the memory 702 may include a hard disk and/or a flash memory.

The processor 701 may be a general-purpose processor, and the general-purpose processor may be a processor that performs a specific step and/or operation by reading and executing instructions (for example, the instructions 7021) stored in a memory (for example, the memory 702). In a process of performing the foregoing step and/or operation, the general-purpose processor may use data (for example, the data 7022) stored in the memory (for example, the memory 702). The general-purpose processor may be, but is not limited to, a central processing unit (central processing unit, CPU). In addition, the processor 701 may alternatively be a dedicated processor. The dedicated processor may be a specially designed processor configured to perform a specific step and/or operation. For example, the dedicated processor may be, but is not limited to, a digital signal processor (digital signal processor, DSP), an application-specific integrated circuit (application-specific integrated circuit, ASIC), or a field programmable gate array (field programmable gate array, FPGA). In addition, the processor 701 may alternatively be a combination of a plurality of processors, for example, a multi-core processor. The processor 701 may include one or more circuits, to perform all or some of the steps of the network configuration method provided in the foregoing embodiments.

The communication interface 703 may include an interface configured to implement interconnection between components inside the execution device 700, such as an input/output (input/output, I/O) interface, a physical interface, or a logical interface, and an interface configured to implement interconnection between the execution device 700 and another device (for example, a network device or a workstation). The physical interface may be a gigabit Ethernet (gigabit Ethernet, GE) interface, and may be configured to implement interconnection between the execution device 700 and another device (for example, a network device or a workstation). The logical interface is an interface inside the execution device 700, and may be configured to implement interconnection of components inside the execution device 700. It is easy to understand that the communication interface 703 may be configured for the execution device 700 to communicate with another network device and/or a workstation. For example, the communication interface 703 is configured to send and receive a message between the execution device 700 and the another network device.

The bus 704 may be any type of communication bus, for example, a system bus, configured to implement interconnection among the processor 701, the memory 702, and the communication interface 703.

The foregoing components may be separately disposed on chips that are independent of each other, or at least some or all of the components may be disposed on a same chip. Whether the components are separately disposed on different chips or are integrated and disposed on one or more chips usually depends on a specific requirement of product design. This embodiment of this application imposes no limitation on specific implementations of the foregoing components.

Figure 8:
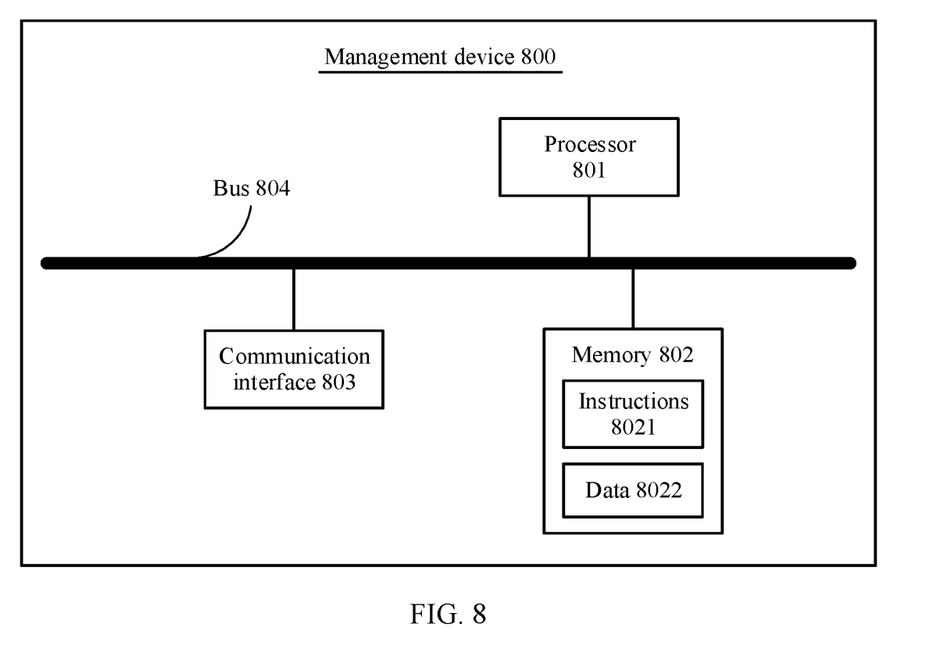
FIG. 8 is a schematic diagram of a structure of a management device according to an embodiment of this application.

Embodiments of this application further provide a management device. As shown in FIG. 8, the management device 800 includes a processor 801, a memory 802, a communication interface 803, and a bus 804. The processor 801, the memory 802, and the communication interface 803 are communicatively connected to each other through the bus 804. A person skilled in the art should understand that a connection manner among the processor 801, the memory 802, and the communication interface 803 shown in FIG. 8 is merely an example. In an implementation process, the processor 801, the memory 802, and the communication interface 803 may alternatively be communicatively connected to each other in a connection manner other than through the bus 804.

The memory 802 is configured to store instructions 8021 and data 8022. The memory 802 may be various types of storage media. For example, the memory 802 may be a random access memory (random access memory, RAM), a read-only memory (read-only memory, ROM), a non-volatile RAM (non-volatile RAM, NVRAM), a programmable ROM (programmable ROM, PROM), an erasable PROM (erasable PROM, EPROM), an electrically erasable PROM (electrically erasable PROM, EEPROM), a flash memory, an optical memory, or a register. In addition, the memory 802 may include a hard disk and/or a flash memory.

The processor 801 may be a general-purpose processor, and the general-purpose processor may be a processor that performs a specific step and/or operation by reading and executing instructions (for example, the instructions 8021) stored in a memory (for example, the memory 802). In a process of performing the foregoing step and/or operation, the general-purpose processor may use data (for example, the data 8022) stored in the memory (for example, the memory 802). The general-purpose processor may be, but is not limited to, a central processing unit (central processing unit, CPU). In addition, the processor 801 may alternatively be a dedicated processor. The dedicated processor may be a specially designed processor configured to perform a specific step and/or operation. For example, the dedicated processor may be, but is not limited to, a digital signal processor (digital signal processor, DSP), an application-specific integrated circuit (application-specific integrated circuit, ASIC), or a field programmable gate array (field programmable gate array, FPGA). In addition, the processor 801 may alternatively be a combination of a plurality of processors, for example, a multi-core processor. The processor 801 may include one or more circuits, to perform all or some of the steps of the network configuration method provided in the foregoing embodiments.

The communication interface 803 may include an interface configured to implement interconnection between components inside the management device 800, such as an input/output (input/output, I/O) interface, a physical interface, or a logical interface, and an interface configured to implement interconnection between the management device 800 and another device (for example, a network device or a workstation). The physical interface may be a gigabit Ethernet (gigabit Ethernet, GE) interface, and may be configured to implement interconnection between the management device 800 and another device (for example, a network device or a workstation). The logical interface is an interface inside the management device 800, and may be configured to implement interconnection of components inside the management device 800. It is easy to understand that the communication interface 803 may be configured for the management device 800 to communicate with another network device and/or a workstation. For example, the communication interface 803 is configured to send and receive a message between the management device 800 and the another network device.

The bus 804 may be any type of communication bus, for example, a system bus, configured to implement interconnection among the processor 801, the memory 802, and the communication interface 803.

The foregoing components may be separately disposed on chips that are independent of each other, or at least some or all of the components may be disposed on a same chip. Whether the components are separately disposed on different chips or are integrated and disposed on one or more chips usually depends on a specific requirement of product design. This embodiment of this application imposes no limitation on specific implementations of the foregoing components.

In the foregoing embodiment, all or a part of the software, hardware, firmware, or any combination thereof may be implemented. When the software is used for implementation, all or a part of the implementation may be implemented in a form of a computer program product. The computer program product includes one or more computer instructions. When the computer program instructions are loaded and executed on a device, all or some of the procedures or functions are generated according to embodiments of this application. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media. The usable media may be a magnetic medium (for example, a floppy disk, a hard disk drive, or a magnetic tape), an optical medium (for example, a digital video disk (Digital Video Disk, DVD)), or a semiconductor medium (for example, a solid-state drive).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

What is claimed is:

1. A network configuration method comprising:
   sending, by a first execution device, a device discovery message to a management device, wherein the device discovery message is a layer 2 packet, the device discovery message comprises a first port identifier,
wherein a port identified by the first port identifier is a port, in an up state, other than a port through which the first execution device sends the device discovery message;
receiving, by the first execution device, a first configuration message from the management device, wherein the first configuration message is a layer 2 packet, the first configuration message comprises a configuration parameter for a second execution device, the configuration parameter for the second execution device comprises an internet protocol address of the second execution device, and the second execution device is connected to the port identified by the first port identifier;
receiving, by the first execution device, an address of the management device from the management device; and
sending, by the first execution device, the address of the management device to the second execution device;
receiving, by the first execution device, a device identifier of the second execution device from the second execution device in response to receiving the address of the management device; and sending, by the first execution device, the device identifier of the second execution device and the first port identifier to the management device; and
sending, by the first execution device, the first configuration message through the port identified by the first port identifier.

2. The method according to claim 1, further comprising:
receiving, by the first execution device, a second configuration message from the management device, wherein the second configuration message is a layer 2 packet, the second configuration message comprises a configuration parameter for the first execution device, and the configuration parameter for the first execution device comprises an internet protocol address of the first execution device.

3. The method according to claim 2, wherein the configuration parameter further comprises an address of a controller, and the controller is a network device configured to manage the management device and a plurality of execution devices in a communication network.

4. The method according to claim 3, further comprising:
sending, by the first execution device, a registration request to the controller based on the address of the controller.

5. The method according to claim 1, further comprising:
receiving, by the first execution device, a first link discovery message from the management device, wherein the first link discovery message is a layer 2 packet, and the first link discovery message comprises an address of the management device; and
returning, by the first execution device, a first link discovery reply message, wherein the first link discovery reply message is a layer 2 packet, and the first link discovery reply message comprises a device identifier of the first execution device.

6. The method according to claim 1, further comprising
receiving, by the first execution device, a second link discovery message from the management device, wherein the second link discovery message is a layer 2 packet, and the second link discovery message comprises the address of the management device and the first port identifier;

sending, by the first execution device, a third link discovery message through the port identified by the first port identifier, wherein the third link discovery message is a layer 2 packet, and the third link discovery message comprises the address of the management device;
receiving, by the first execution device, a second link discovery reply message from the second execution device, wherein the second link discovery reply message is a layer 2 packet, and the second link discovery reply message comprises the device identifier of the second execution device; and
sending, by the first execution device, a third link discovery reply message to the management device, wherein the third link discovery reply message is a layer 2 packet, and the third link discovery reply message comprises the device identifier of the second execution device and the first port identifier.

7. The method according to claim 6, wherein the second link discovery reply message further comprises a second port identifier, a port identified by the second port identifier is a port through which the second execution device is connected to the first execution device, and the third link discovery reply message further comprises the second port identifier.

8. The method according to claim 1, wherein the internet protocol address of the second execution device comprises a management address of the second execution device.

9. The method according to claim 1, wherein the internet protocol address of the second execution device comprises an interconnection address used by the second execution device to communicate with another network device.

10. The method according to claim 1, wherein the communication network to which the management device, the first execution device, and the second execution device belong is an underlying network.

11. The method according to claim 1, wherein the communication network to which the management device, the first execution device, and the second execution device belong is a campus network.

12. The method according to claim 1, wherein the device discovery message is sent based on the first execution device detecting that a port changes from a disabled state to an enabled state, or based on an ending of a detection period, and
wherein the port identified by the first port identifier is a port that is detected by the first execution device and that changes from a disabled state to an enabled state, or is a port that is in the first execution device and that changes from a disabled state to an enabled state during the detection period.

13. A network configuration method comprising:
receiving, by a management device, a device discovery message sent by a first execution device, wherein the device discovery message is a layer 2 packet, the device discovery message comprises a first port identifier, and
wherein a port identified by the first port identifier is a port, in an up state, other than a port through which the first execution device sends the device discovery message; and
sending, by the management device, a first configuration message to the first execution device, wherein the first configuration message is a layer 2 packet, the first configuration message comprises a configuration parameter for a second execution device, the configuration parameter for the second execution device comprises an internet protocol address of the second execution device, and the second execution device is connected to the port identified by the first port identifier; and sending, an address of the management device to the first execution device which then sends the address of the management device to the second execution device;

receiving, a device identifier of the second execution device and the first port identifier from the first execution device, after the first execution device receives the device identifier of the second execution device from the second execution device in response to the second execution device receiving the address of the management device.

14. The method according to claim 13, further comprising:

sending, by the management device, a second configuration message to the first execution device, wherein the second configuration message is a layer 2 packet, the second configuration message comprises a configuration parameter for the first execution device, and the configuration parameter for the first execution device comprises an internet protocol address of the first execution device.

15. The method according to claim 13, further comprising:

sending, by the management device, a first link discovery message to the first execution device, wherein the first link discovery message is a layer 2 packet, and the first link discovery message comprises an address of the management device; and receiving, by the management device, a first link discovery reply message returned from the first execution device, wherein the first link discovery reply message is a layer 2 packet, and the first link discovery reply message comprises a device identifier of the first execution device.

16. The method according to claim 13, further comprising:

sending, by the management device, a second link discovery message to the first execution device, wherein the second link discovery message comprises the address of the management device and the first port identifier, and the second link discovery message indicates the first execution device to send a third link discovery message through the port identified by the first port identifier.

17. The method according to claim 16, wherein a second link discovery reply message further comprises a second port identifier, a port identified by the second port identifier is a port through which the second execution device is connected to the first execution device.

18. A network configuration apparatus, wherein the apparatus is deployed on a first execution device, and the apparatus comprises:

a memory configured to store processor-executable instructions; and a processor configured to execute the processor-executable instructions to cause the network configuration apparatus to:

send a device discovery message to a management device, wherein the device discovery message is a layer 2 packet, the device discovery message comprises a first port identifier, and wherein a port identified by the first port identifier is a port, in an up state, of the first execution device;

receive a first configuration message from the management device, wherein the first configuration message is a layer 2 packet, the first configuration message comprises a configuration parameter for a second execution device, the configuration parameter for the second execution device comprises an internet protocol address of the second execution device, and the second execution device is connected to the port identified by the first port identifier;

receive, an address of the management device from the management device; and send, the address of the management device to the second execution device;

receive, a device identifier of the second execution device from the second execution device in response to receiving the address of the management device; and send, the device identifier of the second execution device and the first port identifier to the management device; and send the first configuration message through the port identified by the first port identifier.

19. The apparatus according to claim 18, wherein the processor is further configured to execute the processor-executable instructions to cause the network configuration apparatus to:

receive a second configuration message from the management device, wherein the second configuration message is a layer 2 packet, the second configuration message comprises a configuration parameter for the first execution device, and the configuration parameter for the first execution device comprises an internet protocol address of the first execution device.

20. The apparatus according to claim 18, wherein the processor is further configured to execute the processor-executable instructions to cause the network configuration apparatus to:

receive a first link discovery message from the management device, wherein the first link discovery message is a layer 2 packet, and the first link discovery message comprises an address of the management device; and return a first link discovery reply message, wherein the first link discovery reply message is a layer 2 packet, and the first link discovery reply message comprises a device identifier of the first execution device.

21. The apparatus according to claim 18, wherein the processor is further configured to execute the processor-executable instructions to cause the network configuration apparatus to:

receive a second link discovery message from the management device, wherein the second link discovery message is a layer 2 packet, and the second link discovery message comprises the address of the management device and the first port identifier;

send a third link discovery message through the port identified by the first port identifier, wherein the third link discovery message is a layer 2 packet, and the third link discovery message comprises an address of the management device;

receive a second link discovery reply message from the second execution device, wherein the second link discovery reply message is a layer 2 packet, and the second link discovery reply message comprises a device identifier of the second execution device; and send a third link discovery reply message to the management device, wherein the third link discovery reply message is a layer 2 packet, and the third link discovery reply message comprises the device identifier of the second execution device and the first port identifier.

* * * * *